(12) United States Patent
Limpens et al.

(10) Patent No.: US 12,110,224 B2
(45) Date of Patent: Oct. 8, 2024

(54) MULTI-NOZZLE DOSING SYSTEM

(71) Applicant: V.B.S. SPRL, Tubize (BE)

(72) Inventors: Bart Limpens, Meerbeke (BE); Xavier Andrieu, Fontaine-l'Eveque (BE)

(73) Assignee: V.B.S. SPRL, Tubize (BE)

( * ) Notice: Subject to any disclaimer, the term of this patent is extended or adjusted under 35 U.S.C. 154(b) by 349 days.

(21) Appl. No.: 17/600,683

(22) PCT Filed: Apr. 2, 2020

(86) PCT No.: PCT/IB2020/053138
§ 371 (c)(1),
(2) Date: Oct. 1, 2021

(87) PCT Pub. No.: WO2020/202057
PCT Pub. Date: Oct. 8, 2020

(65) Prior Publication Data
US 2022/0177289 A1    Jun. 9, 2022

(30) Foreign Application Priority Data
Apr. 2, 2019  (BE) .................................. 2019/5209

(51) Int. Cl.
*B05B 1/18*  (2006.01)
*B67C 3/20*  (2006.01)
*G01F 11/08* (2006.01)

(52) U.S. Cl.
CPC .............. *B67C 3/208* (2013.01); *B05B 1/185* (2013.01); *B67C 3/204* (2013.01); *G01F 11/08* (2013.01)

(58) Field of Classification Search
CPC .......... B05B 1/185; B67C 3/204; G01F 11/08
See application file for complete search history.

(56) References Cited

U.S. PATENT DOCUMENTS

| | | | |
|---|---|---|---|
| 5,529,099 A * | 6/1996 | Janek | B65B 3/32 141/238 |
| 5,595,221 A * | 1/1997 | Lagneau | B67C 3/04 141/180 |
| 5,996,652 A | 12/1999 | Schromm | |
| 6,250,516 B1 | 6/2001 | Story | |
| 9,909,289 B2 * | 3/2018 | Kilian | B05B 1/1609 |

(Continued)

FOREIGN PATENT DOCUMENTS

| | | |
|---|---|---|
| DE | 19535252 A1 | 3/1997 |
| EP | 1657159 A1 | 5/2006 |

(Continued)

OTHER PUBLICATIONS

International Preliminary Report on Patentability dated Feb. 11, 2021 from parent application PCT/IB2020/053138.

(Continued)

*Primary Examiner* — Paul R Durand
*Assistant Examiner* — Randall A Gruby
(74) *Attorney, Agent, or Firm* — Vorys, Sater, Seymour and Pease LLP

(57) ABSTRACT

The present invention relates to an improved nozzle assembly for the high-frequency dispensing of (small) volumes of a dosing fluid in a container, as well as a dosing system according to the nozzle assembly of the invention. The invention also relates to an improved volumetric device for a dosing system.

20 Claims, 9 Drawing Sheets

(56) References Cited

U.S. PATENT DOCUMENTS

| | | | |
|---|---|---|---|
| 9,909,290 B2 * | 3/2018 | Hortmanns | B67C 3/281 |
| 9,926,088 B2 * | 3/2018 | Auer | F16K 11/04 |
| 2003/0213529 A1 * | 11/2003 | Todd | B67C 3/2608 |
| | | | 141/180 |
| 2012/0291898 A1 * | 11/2012 | Auer | B65B 3/22 |
| | | | 222/1 |
| 2016/0214750 A1 | 7/2016 | Kilian | |
| 2019/0077648 A1 | 3/2019 | Wang | |

FOREIGN PATENT DOCUMENTS

| | | | |
|---|---|---|---|
| EP | 2078678 A1 | 7/2009 | |
| EP | 2708491 A1 | 3/2014 | |
| JP | 2015/168475 A | 9/2015 | |
| WO | 1998/18675 A1 | 5/1998 | |
| WO | 2020/202057 A1 | 10/2020 | |

OTHER PUBLICATIONS

ISR-WO dated Jun. 3, 2020 from parent application PCT/IB2020/053138.

* cited by examiner

MULTI-NOZZLE DOSING SYSTEM

TECHNICAL DOMAIN

The invention relates to an improved nozzle for high-frequency dispensing of predetermined volumes of a dosing fluid in pre-filled or unfilled containers. In addition, the invention relates to a volumetric device for accurately measuring the high-frequency dispensed dosages.

STATE OF THE ART

Dosing systems for adding limited volumes (less than 10 ml, or even less than 1 ml) of a particular dosing fluid are typically composed of a nozzle assembly and a dosing chamber in which the dosing fluid is held under a given pressure and presented to the nozzle assembly. The assembly is then periodically opened and closed relative to the dosing chamber to allow intermittent volumes of the dosing fluid to exit through the nozzle. These nozzle assemblies are a so-called nozzle along which the dosing fluid is dispensed to a container. The volumes are pushed out of the dosing chamber along the nozzle assembly, using an actuator that applies additional pressure to the fluid in the dosing chamber, typically reducing the internal volume of the dosing chamber to force the dosing fluid past the nozzle evacuate assembly. Of course, a dosing system includes further subsystems and devices, but these are less pertinent to place the present invention. However, any additional subsystems known in the art for a dosing system may also be added to the dosing system of the invention. In addition, a conveying system is typically provided that feeds the containers to be filled or dosed along the nozzle assembly, typically at a constant speed, so that the nozzle assembly tuned to this speed can provide an appropriate dose in each container.

The applicant noted that known dosing system present a number of problems. Initially, these were found to provide insufficient guarantees of a constant, reliable dose volume with each dose. Namely, it was observed that a dispensed dosing fluid, rather than being ejected in a single, substantially continuous, gut or jet, that its tail had some deformation, and that it was stretched by interaction with the nozzle, including by surface tension of the liquid. This was more noticeable with certain liquids than with others, but the effect is present with any relevant dosing fluid. This stretching of the dosage (or at least of the tail thereof) can cause part of the volume to be dosed to be delayed during dosing, thus missing the opening of the container passing by. Since it is often crucial to have very high accuracy when adding dosing fluid, this cannot be accepted. In another problem, this stretching can also cause part of the dosing fluid to 'stick' to the end of the nozzle, and then come along with the next dosing, which results in an over-dosing volume, or can come loose between two containers, causing contamination of the system.

A second problem noted by the applicant is that for very high frequency dosing applications (more than 5 Hz, typically above 10 Hz, and increasing in the future), it is very difficult to do some form of quality control to the provided volumes. The high speed means that many measurement methods are not possible, and the few that are an option cannot provide the desired accuracy. For that reason, the applicant has further provided an improved volumetric sensor in the invention.

Dosing systems are known from the prior art, such as in US2019/077648, US2003/213529, US 2012/291898, U.S. Pat. No. 6,250,516, EP1657159, U.S. Pat. No. 5,996,652 or DE19535252. However, none of these systems are related to very low dosing in containers with limited headspace, and in particular limited access to them (bottles and cans for drinks, specifically single-dose containers). As a result, a very accurate dosing must be provided at very high frequency and over a very short period of time. None of the documents mentioned are able to provide small doses in containers with limited access.

The present invention aims to solve at least some of the above-mentioned problems.

SUMMARY OF THE INVENTION

The invention relates in a first aspect, a nozzle assembly for the high-frequency supply of predetermined volume dosing fluid, preferably up to maximum volumes dosage fluid of about 10 ml, more preferably from about 5 ml, and even more preferably from about 2.5 ml, and at most preferably to a maximum of 1.0 ml, in liquid containers, such as cans and bottles, where the nozzle assembly includes a multiplicity of essentially the same direction dosing channels for the joint discharge of the dosing fluid in the pre-determined volume, the maximum internal diameter of about 1.5 mm, more preferably about 1.2 mm, even more preferably about 1.0 mm, and wherein the internal diameter of the dosing channels is preferably constant along the dosing channels. Preferably, the internal diameter is at least 0.4 mm, more preferably at least 0.5 mm, even more preferably at least 0.6 mm and even more preferably at least 0.7 mm.

Preferably, at least some of the dosing channels extend at different angles to each other, at least a first group of the dosing channels being oriented such that the extensions of said first group of the dosing channels converge substantially in a convergence point on the distal side of the nozzle assembly, the nozzle assembly comprising at least 6 dosing channels, preferably at least 15 and even more preferably at least 20.

Preferably, the dosing channels are divided into one or more groups, with the (extensions of the) dosing channels of each group converging substantially on the distal side of the assembly (i.e. on the side where the dosing fluid is dispensed). The convergence points of one or more (possibly all) of these groups may coincide in certain embodiments, but may also all be different. Both embodiments have advantages (such as reducing splash at different convergence points, limiting distance from dosing channels to container at same convergence points). These groups are typically positioned in certain patterns (for example, circular or ellipse shaped, in rows, columns, etc.) that often also interact with each other (concentric, parallel, etc.).

An important reason for the rays to converge is that the footprint of the converged dose should be as small as possible. A typical bottle opening is 22 mm, the smaller the diameter of the converged beam, the more time we have to get the dose into the bottle neck.

In a second aspect, the invention relates to a dosing device for the high-frequency supply of predetermined volumes of dosing fluid to pre-filled or non-pre-filled liquid containers via an opening of the liquid containers, wherein the liquid containers are provided at a substantially constant speed along the dosing device, the dosing device comprising at least:

a. a nozzle assembly according to the first aspect, comprising a plurality of dosing channels for co-discharging the dosing fluid in the predetermined volume;

b. a dosing chamber for presenting the dosing fluid to the nozzle assembly under a predetermined or non-constant pressure.

In a preferred embodiment, includes the dosing device a supply of dosing fluid, which supply and a sealing connection provided with the dosing chamber and the dosing chamber of dosing fluid, and wherein the dosing chamber comprises a wall with a deformable component, which is deformable under the influence of a pressure and/or force wherein by deforming the deformable part, the internal volume of the dosing chamber undergoes a volume change, the deformable part comprising an electrically conductive element, and the dosing device further comprising an Eddy current sensor adapted to measure a displacement of the electric conductive element due to deformation of the deformable part.

DETAILED DESCRIPTION

Figure 1A:
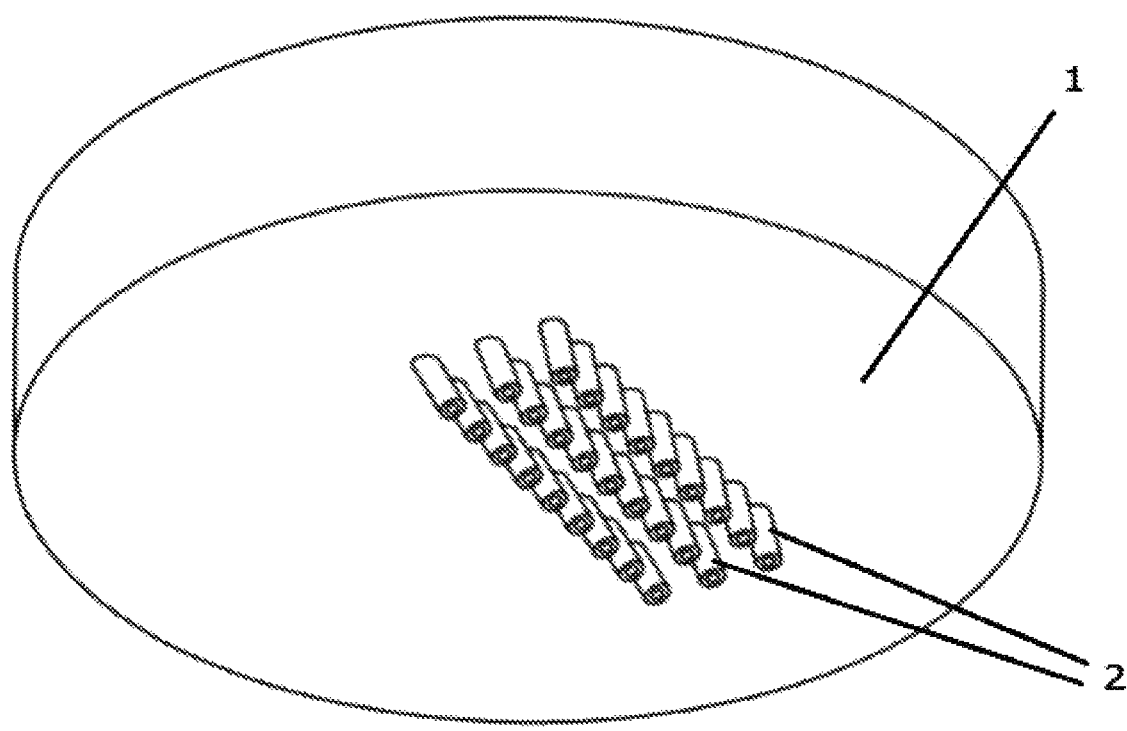
FIG. 1 A-B shows perspective images of a nozzle assembly according to an embodiment of the invention, wherein the distal side of the assembly is shown.

Unless otherwise defined, all terms used in the description of the invention, including technical and scientific terms, have the meaning generally understood by those skilled in the art of the invention. For a better assessment of the description of the invention, the following terms are explicitly explained.

"A", "the" and "it" refer to both singular and plural in this document unless the context clearly assumes otherwise. For example, "a segment" means one or more than a segment.

When "about" or "round" is used in this document with a measurable quantity, a parameter, a duration or moment, and the like, it means variations of +/−20% or less, preferably +/−10% or less, more preferably +/−5% or less, even more preferably +/−1% or less, and even more preferably +/−0.1% or less than and of the quoted value, insofar as such variations of are applicable in the described invention. However, this should be understood to mean that the value of the quantity using the term "about" or "round" is itself specifically disclosed.

The terms "include", "include", "consist of", "consist of", "include", "contain", "contain", "include", "include", "contain", "contain" are synonyms and are inclusive or open terms that indicate the presence of what follows, and that do not exclude or prevent the presence of other components, features, elements, members, steps known from or described in the prior art.

The terms "distal" and "proximal" indicate a direction or position from the point of view of the path that the dosing fluid travels during use of the invention moving from a proximal position to a distal position.

Quoting numerical intervals through the endpoints includes all integers, fractions, and/or real numbers between the endpoints, including these endpoints.

In a first aspect, the invention relates to a nozzle assembly of the high-frequency supply of predetermined volume dosing fluid, preferably up to maximum volumes dosage fluid of about 10 ml, more preferably from about 5 ml, and even more preferably from about 2.5 ml, in the liquid containers, wherein the nozzle assembly includes a plurality of dosing channels extending in an essentially the same direction for the joint discharge of the dosing fluid in the predetermined volume. The dosing channels should preferably have a maximum internal diameter of approximately 2.5 mm, more preferably of about 1.8 mm, even more preferably about 1.5 mm, even more preferably about 1.2 mm, even more preferably from about 1.0 mm, and most preferably about 0.9 mm, and wherein the internal diameter of the dosing channels is preferably constant along the dosing channels.

In preferred embodiments, the predetermined volumes of dosing fluid are up to 1.5 ml, or even up to 1.0 ml, or up to 0.5 ml, or up to 0.25 ml or up to even 0.1 ml. In particular, the invention is optimized for dispensing volumes between 0.05 ml and 1.0 ml, and even more between 0.2 ml to 0.3 ml.

Note that higher and lower volumes are equally possible, e.g. maximum 100 ml or 50 ml or 25 ml. Typically, the volumes of dosing fluid dispensed are in a range between 10 ml and 0.01 ml, more specifically, between 1 ml and 0.1 ml, and must be dispensed in a few milliseconds (between 1 ms and 100 ms, typically up to 50 ms) or even up to 25 or 10 ms). Certain problems arise, of course, which will be discussed further in this text.

The applicant noted that the use of multiple dosing channels allows a nozzle assembly to quickly dispense the volumes of dosing fluid without causing the known problems, namely an elongation of the ejected liquid after leaving the dosing channels (by interaction between liquid and dosing channel, by surface tension of the liquid). As indicated earlier, this stretching has a number of possible consequences, as a result of which the dosed volume is no longer reliable. For example, part of the volume may stick to the nozzle (and come loose between two passing containers, or come with a subsequent dose for a container), which creates an inadmissible variation in volumes. As this already concerns very small volumes, any deviation has major consequences. The consequences of a different dosage of flavors, dyes, fragrances and the like speak for themselves, namely an undersized product, due to a visual, olfactory, gustatory, etc. deviation. This can even have dangerous consequences when used in medicines. The applicant noted that the stretching strongly depended on the internal diameter of the dosing channels. By dispensing through a multitude of dosing channels, it is possible to reduce the diameter of nozzles or dosing channels, which greatly reduces the 'stretching' of the dosages, while still providing the necessary volume at the short dosing time (given the need for a high dosing frequency). Note that it is not an option here to increase the speed at which the liquid is forced through (and out of) the dosing channels, as this leads on the one hand to a more difficult to control and controllable process (which reduces precision in volumes), but more importantly this causes transshipment or a 'splash' upon impact in the container (or on liquid therein). The applicant has further investigated and tested the maximum allowed dimension of the internal diameter in order to find a balance between the ability to provide sufficient volume in a short time (typically a window of 10 ms to provide the dosage) and the other avoid/reduce the 'wispiness' or stretching. To this end, the applicant proposed a maximum internal diameter of about 2.5 mm to sufficiently reduce wisp formation, but noted better results at lower maximum internal diameters. Preferably, therefore, a maximum internal diameter of about 2.0 mm is chosen, more preferably about 1.5 mm, even more preferably about 1.2 mm, and even more preferably about 1.0 mm or even about 0.9 mm. Possible suitable internal diameters are: 0.25 mm, 0.3 mm, 0.35 mm, 0.4 mm, 0.45 mm, 0.5 mm, 0.55 mm, 0.6 mm, 0.65 mm, 0.7 mm, 0.75 mm, 0.8 mm, 0.85 mm, 0.9 mm, 0.95 mm, but intermediate values are also possible.

According to a preferred embodiment, the dosing channels comprise a minimum internal diameter of about 0.4 mm, more preferably about 0.5 mm, even more preferably about 0.6 mm, and most preferably about 0.7 mm.

In particular, an internal diameter between 0.75 mm and 1.0 mm has remained extremely effective.

As indicated, it is equally important to be able to move a sufficiently large volume in a short period of time without increasing the stowage speed of the dosing fluid too high (in view of the ensuing problems to be avoided). For this reason, sufficient dosing channels must be provided on the one hand, but also sufficiently wide dosing channels in terms of internal diameter on the other. The applicant noted that the above-mentioned limits further supported the object of the invention.

According to a preferred embodiment, the nozzle assembly comprises at least 5 dosing channels, preferably at least 10 and even more preferably at least 20. More preferably, the number of dosing channels is between 25 and 60, even more preferably between 40 and 55.

Due to the limitation in internal diameter of the dosing channels and the limitation in speed with which the liquid may be pushed through the dosing channels (to avoid transshipment), it becomes difficult to obtain the necessary flow during the short time in which a container is at a is in the 'dosing' position. Because in belting applications the containers pass at high speeds and do not stand still at the dosing setting, the time in which the opening of the container is in a suitable position must be taken into account, so that a jet from a dosing device enters the opening. Typically, this is a few milliseconds. For this reason, the applicant uses a plurality of dosing channels, through the use of the many dosing channels he can use a more limited internal diameter, thus avoiding streak formation, while still ensuring a sufficiently high flow rate under a limited flow rate. For example, in a preferred embodiment, a minimum amount of 10 dosing channels was found to achieve the intended benefits. However, the applicant noted that it is appropriate to opt for a larger number, such as at least 15 dosing channels, or even at least 20. Preferably, the nozzle assembly comprises at least 25 dosing channels, more preferably at least 30, even more preferably at least 35 or even 40. In possible embodiments, there are at least 50, 60, 70, 80, 9, 100 or more dosing channels, possibly spread over multiple nozzle assemblies.

A limiting factor here is on the one hand the size of the opening of the container, and the internal diameter of the dosing channels.

In a preferred embodiment, at least some of the dosing channels extend at different angles to each other. This is preferably the case for (almost) all dosing channels. Crucially, these angles provide an orientation of the dosing channels, for certain groups of dosing channels (groups comprising a plurality and preferably at least 5 dosing channels) the extensions thereof (on the distal or distribution side) converge substantially in a convergence point.

Preferably, all dosing channels are divided into a number of such groups (the groups together comprising all dosing channels), and the dosing channels of each of the groups converge at such a convergence point. In some embodiments, some, or even all, of these convergence points substantially coincide, but in other embodiments, these convergence points are all different.

In a preferred embodiment, a maximum value of said angles is at least 5°, and a minimum value is at least 2.5°. These values allow to ensure with a large number of dosing channels that convergence is achieved at an acceptable distance (i.e. so that distance container—nozzle assembly remains low enough and external effects, such as air resistance, can have little impact). In certain embodiments, the maximum value of the aforementioned angles can for instance be up to 10° or even 45° (or more), where a large number of dosing channels must converge at a limited distance between container and nozzle assembly).

In a preferred embodiment, at least one, preferably at least 2, 3, 4 or more, and more preferably at least half, of the dosing channels makes an angle of at least 5° with respect to an average direction of the dosing channels. The mean direction has a vector equal to the sum of the vectors along which the dosing channels extend towards the distal side, divided by the number of dosing channels. For example, in the embodiments of FIG. 1B-2B-6-7-9, this is a perpendicular to the nozzle assembly (element 1).

Preferably at least 2, 3, 4 or more, and more preferably at least a quarter of the dosing channels make an angle of at least 10° with respect to the average direction. Often here will be a spread of the effective angles of the channels, with most, if not all, of not being parallel to the mean direction.

In a preferred embodiment, the dosing channels are directed to converge over a distance of up to 75 mm from the nozzle assembly, preferably up to 50 mm, or even up to 40 mm or 30 mm from the nozzle assembly. By limiting the distance over which the individual rays extend, the degree of external factors affecting this is also limited, since the individual rays are typically more sensitive than a unified ('thicker') ray, for example for air resistance.

In a preferred form, the (open distal ends of the) dosing channels are positioned in several approximate circular patterns, which represent the groups discussed above, with an approximately common axis of rotation, i.e. concentric. Thereby, the dosing channels of each circular pattern are oriented so that the extensions of said dosing channels converge substantially in a convergence point. In a first variant, the convergence points differ per circular pattern. Alternatively, two or more, even all, convergence points coincide substantially.

Preferably, the dosing channels of each circular pattern are all oriented with respect to an average orientation (17) of the dosing channels of the circular pattern at an angle of substantially the same size (i.e. the same size of the angle for the dosing channels per circular pattern, the value of the angle may differ between patterns). This ensures the same travel distance for beam convergence.

At different convergence points, the dosing channels of the smaller (inner) circles (groups) will preferably converge earlier than the larger ones to avoid rays of different 'groups' crossing. This means that the convergence points of the smaller radius circles are closer to the nozzle in terms of distance than the convergence points of larger radius circles.

According to a preferred embodiment, the dosing channels make an angle of at most about 50°, preferably about 40°, more preferably about 35°, even more preferably about 30° and most preferably about 25°, with respect to an average direction of the dosing channels.

As indicated earlier, placing the dosing channels at an angle to an 'average' direction allows the dosing channels to be spaced sufficiently apart while still allowing a sufficiently focused dose to be delivered into the confined opening of a container for the short period of time in which it is in a suitable position. The average direction here is typically substantially vertical during use of the nozzle assembly, using gravity to optimally evacuate the original volume present in the dosing channels. However, the applicant noted that an angle of the dosing channels that deviates too much from the vertical direction may lead to droplets forming which can separate from the dosing channels between two dosages (less contact surface between liquid and dosing channel if the plane of the open end thereof is not horizontal in use, or larger diameter if the plane of the end is adapted to be horizontal in use). For these reasons, the angle of the dosing channels with the "average" direction, which will run approximately vertically during use, should be limited. The applicant indicates that this angle should be less than 50°, but preferably less than 30° or even 25°, for example maximum 22.5°, 20°, 17.5°, 15° or less.

According to a preferred embodiment, the open distal ends of the dosing channels are positioned in an approximate circular pattern, or the open distal ends of the dosing channels are positioned in multiple (preferably 2 or 3) approximate circular patterns with an approximately common axis of rotation, preferably wherein the dosing channels extend further distally as the distal ends of said dosing channels are further from the axis of rotation. The latter preferred form ensures that the path to be traveled from the distal ends of the dosing channels to the opening of the container is approximately the same from each of the dosing channels.

In a further preferred embodiment, the dosing channels are essentially straight, and the open distal ends of the dosing channels are positioned in a plurality of (preferably 2 or 3) approximate circular cartridges with an approximately common axis of rotation-, the dosing channels of each of the circular cartridges oriented to a (whether or not separately) common point or zone for each of the circular patterns, the common point or zone of a circular pattern of a given radius being further away from the nozzle assembly than the common points or zones of circular patterns with a radius lower than the determined radius of said circular pattern. The latter feature can also be interpreted as where the common point or zone of circular cartridges is less distant from the nozzle assembly the smaller the radius of the circular cartridge. This can also be described as follows: the dosing channels of circular cartridges with a lower radius (i.e. in the sense of diameter) are directed to converge a flow of dosing fluid dispensed therefrom before flows of dispensed dosing fluid from dosing channels of a circular pattern with a higher beam converge, whereby the dosing channels are controlled substantially simultaneously.

In this way, the flows of dosing fluid supplied by the inner dosing channels first converge. The applicant noted that this provided better beam formation, since the 'inner' ring of dosing channels converges relatively easily and forms a beam because they converge only at a limited angle. Subsequent rings often converge at a higher angle, but are stabilized by the previously formed radius of previously converged rings. The flows from the dosing channels of more inward rings are more likely to converge because they have a shorter path length (due to lower radius of more inward rings). In addition, the dosing channels of the different rings are also angulated with respect to a perpendicular to the nozzle (or according to the final aggregated jet of dosing fluid), so that the angle of the dosing channels of more inward rings is closer to 90° on the nozzle (or more parallel to the aggregated dosing fluid jet) with respect to dosing channels of more outwardly located rings. This is also clearly visible in the Figures.

In possible embodiments, the dosing channels extend further or less distal as the distal ends of said dosing channels are farther from the axis of rotation. Alternatively, they extend about the same distance.

In a possible embodiment, the dosing channels are positioned in one or more rows, the dosing channels of the row being oriented so that the extensions of the dosing channels of said row converge substantially in a convergence point, the convergence points of different rows being coincident or not. By not allowing them to coincide, one can respond to the movement of the container during dosing, in addition to limiting or avoiding a splash in convergence.

In a possible embodiment, the dosing channels are positioned in a substantially rectangular pattern in rows and columns, the dosing channels all pointing substantially towards a common zone. This configuration is specifically suitable for dispensing canned dosing fluid.

In a preferred embodiment, each dosing channel is provided with a separate valve for controlling it. That way it can be guaranteed that each of the dosing channels can be closed when required, and that they all opened at the same time can be. Incomplete sealing leads to incorrect pressure build-up and possible leaks, making the dosing completely unreliable.

If working with separate valves for each dosing channel, the timing of each valve can also be adjusted separately. The valves are positioned like a manifold above the bottle track. Each valve fires only when the bottle passes at a certain position to allow the dose to accumulate to the desired value.

According to a preferred embodiment, the dosing channels have a length of between about 5 mm and about 60 mm, preferably between about 7.5 mm and about 20 mm, and even more preferably between about 8 mm and about 12 mm, and most preferably from about 10 mm.

The applicant noted that the length can also influence the final dosage. A dosing channel that is too short (being a narrow passage) can cause turbulent—understandably insufficient laminar—flow through it, and a resulting turbulent jet that is forced out of the dosing channels. Given the limited time and small physical opening (typically with a diameter between 20 mm and 40 mm, or between 22 mm and 32 mm) in which each container can be operated, one cannot afford to lose parts of the dosing volume by a turbulent flow. For this reason, the dosing channels must be sufficiently long. Preferably, the dosing channels are at least 5 mm long, more preferably at least 7.5 mm long and even more preferably about 10 mm.

In addition, problems can also arise with too long dosing channels, namely a kind of 'lag' on the dose. The volume to be dosed is (partly) delivered too late in the container because the dosing channels are too long. After all, when supplying a volume through the dosing channel, the volume contained therein is completely ejected from the dosing channel. Given the limitations of the liquid's thrust, a longer dosing channel also means that the evacuation of the liquid in it lasts longer, and it is (partly) expelled too late, and the liquid can thus open the container miss. The applicant therefore wishes to avoid, or at least minimize, specific lag.

In addition, a longer evacuation time is also difficult to estimate because the variation on this increases proportionally with the duration. The longer the period of time required to completely evacuate a dosing channel, the longer the statistical deviations become. For that reason it is therefore very important to minimize the time period required for evacuation in order to keep the variation thereon low. By setting a limited length for the dosing channels, it is thus ensured that the dosing volumes are supplied integrally in the (opening of the) container. The applicant noted for this purpose that a dosing channel may be a maximum of 60 mm long, but preferably a maximum of 45 mm and more preferably a maximum of even 30 mm long or even less, such as 20 mm or 15 mm.

Possible lengths for the dosing channels are, for example, 16 mm, 17 mm, 18 mm, 19 mm, 21 mm, 22 mm, 23 mm, 24 mm, 25 mm, 26 mm, 27 mm, 28 mm, 29 mm, 31 mm, 32 mm, 33 mm, 34 mm, 36 mm, 38 mm, or intermediate values.

According to a preferred embodiment, the open distal ends of the dosing channels are positioned at a minimum mutual distance of about 0.8 mm from each other, preferably at a minimum mutual distance of about 1.2 mm, further preferably at a minimum mutual distance of about 1.3 mm, and even more preferably, at a minimum mutual distance 1.4 mm.

Preferably, the open distal ends of the dosing channels are positioned at a maximum mutual distance of about 3.0 mm from each other, preferably at a maximum mutual distance of about 2.5 mm, further preferably at a maximum mutual distance of about 2.0 mm, still more preferably at a maximum distance of 1.75 mm and most preferably at a maximum distance of about 1.6 mm.

In a most preferred embodiment, the mutual distance is about 1.5 mm.

In a further development of the aforementioned aspect, the applicant also noticed that the configuration, and in particular the mutual distances between the (ends of the) dosing channels, can play an important role. For example, these must of course be placed close enough to ensure that the intended volume can be dispensed into the opening of a passing container.

Placing the dosing channels at different angles in order to allow a greater mutual distance can only be limited, as the opening of the containers is often also limited in other dimensions (outside diameter). In general, it should be stated that the dosed liquid must be injected at the bottom in a vertical direction with a small margin compared to the perpendicular position.

For this reason, the ends of the dosing channels must therefore be placed sufficiently close to each other, which, however, may cause a possible drawback, namely droplet formation due to liquid accumulation of two or more dosing channels. Liquid residues always remain in the dosing channels between dosages, and in particular at the mouths of the dosing channels. This can be included in the dosage, assuming that a (fairly reliable, with limited variation) solid volume of liquid always remains. Because they are always very limited volumes with low mass, they cannot separate from the surface of the nozzle assembly. However, if the dosing channels open too close to each other, there is the possibility that several, separately too light, drops recombine into a single drop that can detach. On the one hand, a transport mechanism for the containers can become soiled, and dosages can also change in volume (both too much and too little), which is undesirable.

For that reason, the spacing must also be optimized, with the applicant experiencing the maximum and minimum distances indicated above as appropriate.

In a preferred embodiment, the nozzle assembly comprises two or more separate nozzles, each comprising one or more of the dosing channels, the nozzles each comprising a separate dosing fluid supply. The applicant noted that in certain circumstances it is more advantageous to distribute the dosing over a longer stretch, given the limited opening size of the container and the limitation in terms of 'speed' of the discharge of the dosing channels (avoid splash). By performing this in a segmented manner, it is not advantageous to work with a single nozzle. One possibility here is to provide the assembly in a segmented manner, in which successive nozzles (whether or not supplied from a common reservoir supplied with dosing fluid) are positioned along a filling line, which can successively provide dosing fluid in the opening of a container. The individual nozzles have one or more dosing channels according to the invention.

In a further preferred embodiment, each individual nozzle is provided with a separate valve for controlling the dosing channels of the nozzle. This makes it possible to leave the dosing channels open and closed separately, and thus to control the discharge of the dosing fluid. In particular, in a filling line, as described above, this is particularly advantageous, since it allows to with a common reservoir and pump is to work, but the nozzle can operate independently. It is even possible to work with a shared dosing chamber, which supplies all nozzles with the dosing fluid. Alternatively, it is possible to work with a separate dosing chamber for each nozzle, which are interconnected, or with separate dosing chambers per nozzle, the dosing fluid being kept pressurized by a common pump via a supply from the pump to each dosing chamber.

In an alternative embodiment, however, the invention relates to a nozzle assembly with only one (single) nozzle, which comprises a plurality of dosing channels.

According to a preferred embodiment, the dosing channels are essentially straight and all are directed substantially towards a common point or zone.

The straight dosing channels are important for, among other things, developing a good, laminar flow through and out of the dosing channels. Moreover, by aiming it at a common point or zone, it is possible to let the jets converge towards the opening of the container. Since the opening has a limited size, this can be very useful, especially because the division into smaller dosing channels with limited flow (instead of a single channel with a high flow) means that sufficient dosing channels must be provided. If a minimum distance is also to be taken into account, this mutually angled configuration becomes even very important, since this allows an extra distance between the dosing channels. Finally, part of the momentum of the different dosing beams can also be absorbed in this way, since the center-centered part of the speed of each dosing beam is (partially) compensated for by that of the other dosing beams when converging.

According to a preferred embodiment, the dosing channels have substantially the same length and/or substantially the same internal diameter.

By operating with a substantially constant diameter, the chance of turbulences is much lower. In addition, a constant length is preferably chosen to ensure a correct dosage volume, as well as to ensure a laminar flow. At constant length, however, a possible variation of a maximum of 20%, preferably a maximum of 10% and more preferably a maximum of 5%, or even 4, 3, 2, 1% or less must be taken into account.

In a possible embodiment, the dosing fluid is supplied to the dosing chamber (s) under a substantially constant pressure. In a specific embodiment, the dosing fluid is supplied to the dosing chamber (s) via a hydrostatic column. The advantage of this is that a substantially constant pressure can be generated in one or more dosing chambers in a simple manner, while moreover a dosed volume over a certain time unit, and thus an average dosing volume, which is provided to the dosing chambers can also be measured. This can be done, for example, by varying the height of the column slightly (for example during X number of dosages) before the column is replenished. On the basis of the displaced volume, an average dosing volume can thus be measured for verification.

According to a preferred embodiment, the nozzle assembly is suitable for the dosing of dosing fluids which contain substantial ethanol and/or glycol, and optionally further one or more additives.

According to a preferred embodiment, the dosing channels extend independently of each other at the distal ends, preferably over at least 2 mm, more preferably over at least 3 mm and even more preferably over at least 4 mm, for example 5 mm. The dosing channels extend into separate tubes. The applicant noted that in this way, the combination of liquid from separate, adjacent channels, and the possible resulting drop formation, is avoided or at least reduced.

According to a preferred embodiment, the nozzle assembly comprises a, preferably disk or roll-shaped body, through which the dosing channels extend (substantially in the direction of the longitudinal axis of the body) with an open proximal end on a first (proximal) side of the body and an open distal end on a second (distal) side of the body (opposite to the first side). The distal ends extend further relative to the body in separate hollow tubes (also considered to be sleeves, tubes, nozzles, etc.). Preferably, the proximal side dosing channels are substantially parallel to each other at least a certain distance from the proximal side.

In a further preferred embodiment, the open proximal ends of the dosing channels are positioned in a circular pattern on the proximal side of the body.

In an even more preferred embodiment, the open proximal ends are positioned in multiple (2, 3, 4, 5 or more) concentric circular patterns on the proximal side of the body. Furthermore, (optionally) one or more circular grooves or canals may also be present between successive concentric circular patterns. In particular, this offers additional options in sealing the nozzle assembly, as discussed further in this document.

In what follows, the nozzle assembly according to one or more embodiments of the first aspect is integrated in a dosing device. The advantages as indicated above therefore also apply to the following embodiments of the dosing device.

In a second aspect, the invention relates to a dosing device for the high-frequency supply of predetermined volumes of dosing fluid to pre-filled or non-pre-filled liquid containers via an opening of the liquid containers, wherein the liquid containers are provided at a substantially constant speed along the dosing device, the dosing device comprising at least:
  a. a nozzle assembly comprising a plurality of dosing channels for co-discharging the dosing fluid into the predetermined volume;
  b. a dosing chamber for presenting the dosing fluid to the nozzle assembly under a predetermined or non-constant pressure.

In a preferred embodiment, the dosing device comprises a supply of dosing fluid, which is connected and closable to the dosing chamber and which provides the dosing chamber with dosing fluid, and wherein the dosing chamber comprises a wall with a deform deformable part, preferably a membrane, which is deformable under the influence of a pressure and/or force at which the deformation of the deformable part undergoes the internal volume of the dosing chamber has a volume change, wherein the deformable part, one or more electrically conductive elements, and, and wherein the dosing device further comprises an Eddy current sensor comprises adapted for measuring a displacement of the electrically conductive element due to a deformation of the deformable part. Note that multiple eddy current sensors can be provided.

The use of an Eddy current sensor or Eddy current sensor for volumetric applications, especially for very low volumes, is unknown in the field. Typically, dosing devices use a membrane in the wall of the dosing chamber that is actuated by an external force/pressure and deforms the membrane, changing the volume of the dosing chamber. Therefore, since the internal volume is reduced by the deformed membrane, the dosing fluid contained in the dosing chamber must be partially diverted, which is done through the nozzle assembly (being the only free path). The applicant noted that it is very important for quality control to be able to measure the volumes provided somewhat during operation. Due to the high frequency this is almost impossible with the known systems and must be relied on offline measurements with delay. To solve this, the applicant inventively uses the fact that the deformation of the membrane dictates how much volume of dosing fluid to move. By measuring this deformation, the volume of each dose can thus be determined. For this purpose, one or more electrically conductive elements have been provided in/on the membrane, and an eddy current sensor has been provided that can register the displacement/distance/deflection of the one or more electrically conductive elements. With the knowledge of this deviation, the displaced volume can therefore be easily calculated. For example, by providing an electrically conductive element centrally on a substantially circular membrane, it is easy to calculate the volume with which the membrane reduces the dosing chamber for a given registered deflection.

In a preferred embodiment, the dosing fluid is kept under pressure in the dosing chamber during dosing between about 0.025 bar and 1.5 bar, preferably between 0.05 bar and 1.25 bar, more preferably between 0.1 bar and 1.0 bar, even more preferably between 0.15 bar and 0.5 bar or even 0.4 bar, and preferably around 0.2 bar. The applicant noted that the above pressure levels are optimal, in particular between 0.1 bar and 0.5 bar, the lower limit ensuring that there is sufficient flow, and also ensuring that the individual dosing jets flow into each other. The upper limit ensures that the flow rate does not become too high as this compromises the dosing accuracy and additionally presents additional drawbacks such as dripping.

In a specific embodiment, the pressure in the dosing chamber is kept substantially constant throughout the dosing cycle, with the dosing cycle starting from opening the dosing channels/dosing valve to closing the dosing channels/dosing valve completely. Preferably this is achieved by providing a measuring device for determining the pressure (pressure sensor) in the dosing chamber, which feeds the measured pressure back to the actuator (for example a servomotor) which provides the necessary pressure (in certain embodiments the actuator the membrane deforms during dosing).

In a third aspect, the invention relates to a dosing device for the high-frequency supply of predetermined volumes of dosing fluid to pre-filled or non-pre-filled liquid containers via an opening of the liquid containers, wherein the liquid containers are provided at a substantially constant speed along the dosing device. The dosing device comprises a nozzle assembly for discharge of the dose of fluid, and a dosing chamber for the provision of the dosage of liquid to the nozzle assembly at a predetermined or non-constant pressure. The dosing chamber here comprises a wall with a deformable part, preferably a membrane. This deformable part is deformable under the influence of a pressure and/or force, whereby by deforming the deformable part the internal volume of the dosing chamber undergoes a volume change, the deformable part comprising one or more electrically conductive elements, and wherein the dosing device furthermore eddy current sensor adapted to measure displacement of the electrically conductive element due to deformation of the deformable part. By measuring the displacement of the deformable part into the wall of a dosing chamber, is the displaced volume registered on the dosage of liquid in the dosing chamber.

In a preferred embodiment of the invention according to the second or third aspect, the dosing device comprises a pneumatic actuator for deforming the deformable component, preferably wherein the actuator operates on the basis of compressed air.

In a preferred embodiment of the invention according to the second or third aspect, the dosing device comprises a pneumatic actuator for deforming the deformable part, preferably wherein the actuator operates on the basis of compressed air.

In a preferred embodiment of the invention according to the second or third aspect, the closure is coated on the side of the nozzle assembly for liquid-tight sealing of the nozzle assembly of the dosing chamber. This coating should be (substantially) resistant to ethanol, and is preferably durable (wear-resistant) in view of the stressful use thereof. Finally, the material must also be suitable for contact with foodstuffs (Food Grade). A possible embodiment for the coating is or includes an elastomer, as it partially deforms to ensure the liquid tight closure. In a further preferred embodiment, the elastomer coating comprises propylene monomer, preferably fluorinated propylene monomer (FPM or FKM).

The applicant noted that the coating, and in particular an FPM coating, provides a much improved sealing of the dosing channels. By making the closure as perfect as possible, the dosing channels are prevented from emptying between different dosages.

In a further preferred embodiment of the invention according to the second or third aspect, the closure is provided with a plurality of openings through the closure, and wherein the closure is positioned in the dosing device, the openings in the closure not allowing liquid communication between the dosing chamber and the nozzle assembly when the closure closes the liquid connection between the dosing chamber and the nozzle assembly. The openings through the closure allow a better (faster) flow of the dosing fluid when opening the closure.

In an even further preferred embodiment of the invention according to the second or third aspect, the open proximal ends are positioned in multiple (2, 3, 4, 5 or more) concentric circular patterns on the proximal side of the body. Furthermore, (optionally) one or more circular grooves or canals may also be present between successive concentric circular patterns. Especially in combination with the preceding embodiment, in which the closure comprises openings therethrough, this further ensures a faster flow of the dosing fluid.

In a possible embodiment of the aspects of the invention, it comprises a closure for liquid tightly closing the extending ends of the dosing channels (distal ends). The closing piece allows to protect the dosing channels when not in use.

In a possible embodiment of the invention, it comprises an automated shutter that allows internal cleaning of the device, and specifically of the dosing channels. The tailpiece drains a cleaning liquid that is pushed through the appliance into a suitable container.

In a preferred embodiment of the invention according to the second or third aspect, the nozzle assembly is a nozzle assembly as described in the first aspect, with all the consequent advantages.

In a preferred embodiment, the nozzle assembly comprises two or more separate nozzles, each comprising one or more of the dosing channels, and the nozzles each comprising a separate dosing fluid supply.

In a first further embodiment, each of the nozzles is provided with a separate dosing chamber, which is supplied with dosing fluid (by means of a pump) from a reservoir. One pump can be used to supply dosing fluid to each of the dosing chambers, or separate pumps can be provided per 1, 2, 3, 4, . . . dosing chambers, which makes it better to control them in groups. Alternatively or additionally, the dosing chambers can also be directly connected to each other.

In a second further embodiment, the nozzles are provided with a common dosing chamber, which is supplied with dosing fluid from a reservoir (with the aid of a pump).

In a preferred embodiment, the nozzles are arranged grouped in rows, with two or more, preferably three, nozzles per row. The nozzles are preferably provided with a common dosing chamber per row (although the nozzles per row can in principle also be regarded as a single nozzle). Preferably, a common supply runs to each of the dosing chambers of the nozzles of a row, more preferably to all dosing chambers of the nozzles of each row.

In a possible further embodiment, the plurality of nozzles, and in particular the dosing channels, of a row can be directed to converge the jets of dosing fluids at a central point or region. Alternatively, the dosing channels can also be provided substantially parallel.

In a preferred embodiment, the dosing device is provided for the at least one pump, and keep it under pressure of the dosing fluid in the dosing chamber (s), preferably wherein a common pump, the dosing fluid in the dosing chamber (s) includes, among pressure, preferably wherein the pressure is kept substantially stable in the dosing chamber (s) during the discharge of the dosing fluid, further preferably wherein said pressure is between 0.025 bar and 2 bar, further preferably between 0.05 bar and 1.5 bar, even more preferably between 0.1 bar and 1 bar, even more preferably between 0.15 and 0.5 bar, most preferably about 0.2 bar.

In certain embodiments, it is not a pump but a different dosing fluid displacement system, such as a deformable membrane. In such an embodiment, the pressure in the dosing chamber (s) is also kept substantially stable during the discharge of the dosing fluid, further preferably wherein said pressure is between 0.025 bar and 2 bar, further preferably between 0.05 bar and 1.5 bar, at still more preferably between 0.1 bar and 1 bar, even more preferably between 0.15 and 0.5 bar, most preferably about 0.2 bar.

In a preferred embodiment, the distance between the distal ends of the dosing channels to the central point/zone where the jets of the individual dosing channels of the nozzle assembly converge is between 2.5 and 100 mm, preferably between 5 and 50 mm.

In a further aspect, the invention relates to a method using the nozzle assemblies and/or dosing devices according to the invention, wherein the dosing channels of the nozzle assembly/nozzle assemblies jointly provide a desired volume of dosing fluid in containers which, via a transport direction, are substantially continuous (at preference to constant speed) along the nozzle assembly (s).

In a still further aspect, the invention relates to the use of the nozzle assemblies and/or dosing devices according to the invention for supplying dosing fluid in a container.

In what follows, the invention is described by non-limiting examples illustrating the invention, which are not intended or should be construed to limit the scope of the invention.

EXAMPLES

Example 1

The nozzle assembly of FIG. 1A includes a body through and from which a plurality of dosing channels extend. FIG. 1A shows the distal ends of the dosing channels through which dosing fluid is ejected. The dosing channels (2) are arranged in an orderly pattern of 3 rows with 9 dosing channels each. The angles at which they protrude from the body deviate from the perpendicular angle to the body (1), and also deviate slightly from each other so as to be able to dose into the opening of the container. The dosing channels are angled between about 10° and about 35° depending on the position. Alternatively, the dosing channels can also run substantially parallel. The applicant noted that this is particularly advantageous for containers with a limited headspace, because in this way the rays individually impact, thus reducing the chance of transshipment. The dosing channels have a minimum spacing of about 1.5 mm, with the dosing channels extending about 5 mm relative to the body of the nozzle assembly. The dosing channels (2) are preferably all directed to a common point or common zone (16), this zone being typically located beyond the opening of the container, and beyond the expected level of an already present liquid. The applicant noted that such a configuration was ideally suited for providing a dosing fluid in cans (e.g. for drinks such as soft drinks), given the shape of the opening, and the limited headspace or headspace that is present, unlike with bottles, (and impact can therefore best be limited by depositing in separate beams).

Example 2

Figure 1B:
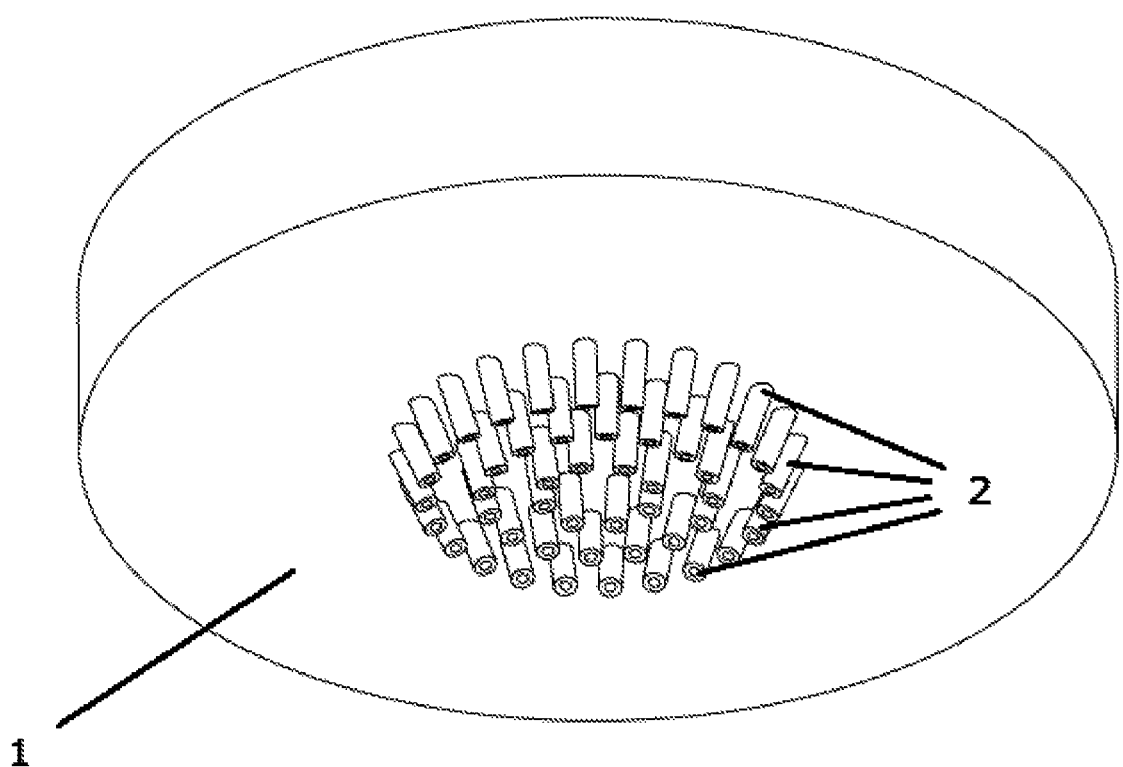

FIG. 1B shows a second nozzle assembly, with the dosing channels (2) extending through and further from the body (1), in a configuration of 3 concentric circular patterns. The outer pattern comprises 24 are mutually equidistant along the diameter positioned dosing channels, the middle pattern and the inner pattern contains respectively 16 and 8 mutually equidistant along the diameter positioned dosing channels. The outer dosing channels are positioned at an angle of about 20° to the 'average' direction (17) of the dosing channels, which corresponds to the perpendicular to the surface from which the dosing channels extend from the body, the dosing channels of the center cartridge are positioned under an angle of about 15°, and the dosing channels of the inner cartridge at an angle of about 7.5°, with a minimum spacing of about 1.5 mm, and the dosing channels extending about 5 mm with respect to the nozzle body-assembly. The dosing channels (2) are thus all directed to a common point or common zone (16), this zone typically located above the opening of the container. The applicant noted that such a configuration was ideally suited for the provision of a dosing fluid in bottles (e.g. for drinks, such as soft drinks), given the shape of the opening and the wider headspace (less risk of transshipment).

Figure 2A:
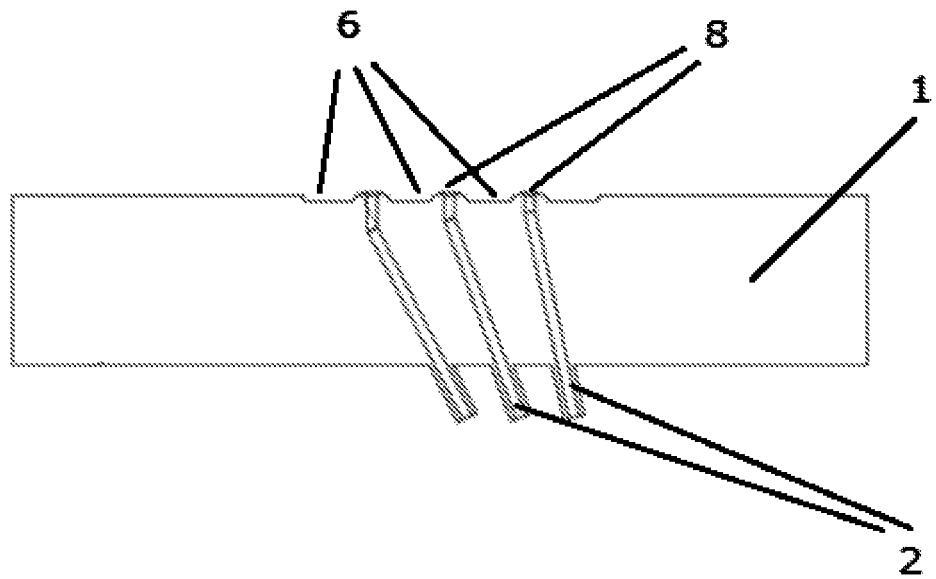
FIG. 2 A-B shows cross-sections of nozzle assemblies in accordance with the respective of embodiment and of FIGS. 1A-B of the invention.
Figure 2B:
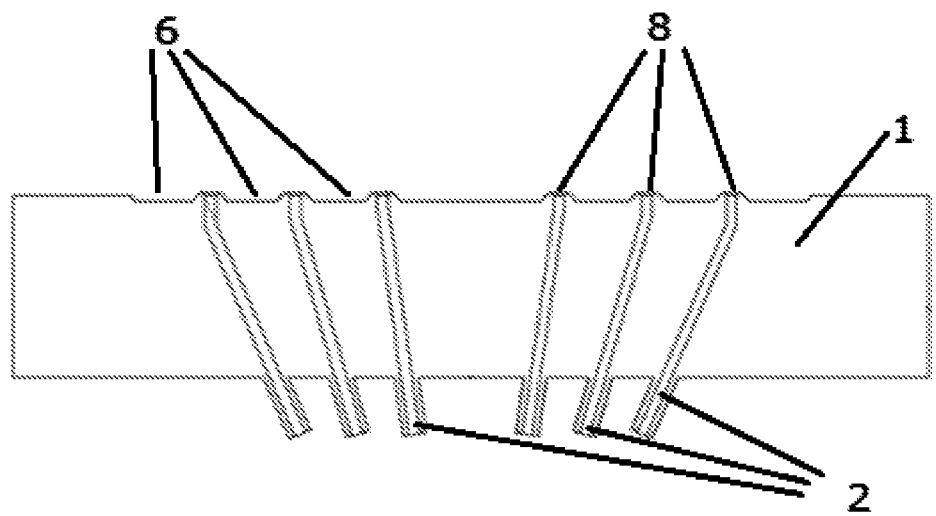

A cross-section of the nozzle assembly according to FIG. 1A is furthermore also shown in FIG. 2A. FIG. 2B shows a cross section for FIG. 1B. The applicant also wishes to draw attention to the 'protruding' ends (8) of the dosing channels on the proximal side (top of FIGS. 2A-2B), which allows for improved sealing with a partially flexible/deformable closure (3), certainly if a further coating (FPM or otherwise) is used on the closure (3). In addition, the distal ends of the dosing channels on FIG. 2B are positioned at different angles from the perpendicular to the nozzle (greater angle as the dosing channels are further) such that the rays from the inner ring dosing channels converge rather than more outward rings.

Figure 3:
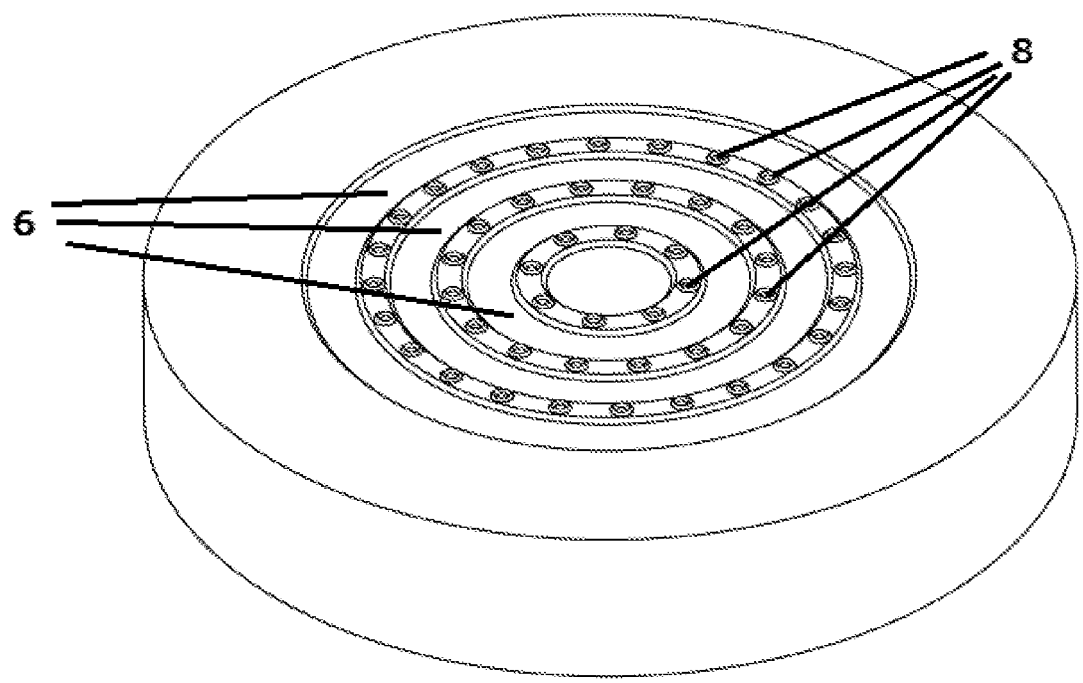
FIG. 3 shows a perspective view of a nozzle assembly according to an embodiment (according to FIGS. 1B-2B) of the invention, showing the proximal side of the assembly.

Finally, FIG. 3 provides a perspective view of the proximal portion of the nozzle assembly of FIGS. 1B and 2B. The proximal ends (8) of the dosing channels are clearly visible in the three circular patterns. In addition, circular grooves or cutouts (6) are also visible between the circular patterns in (and beyond and within). These grooves (6) are also visible in FIGS. 2A-2B, and FIGS. 5A-5B.

Example 3

Figure 4:
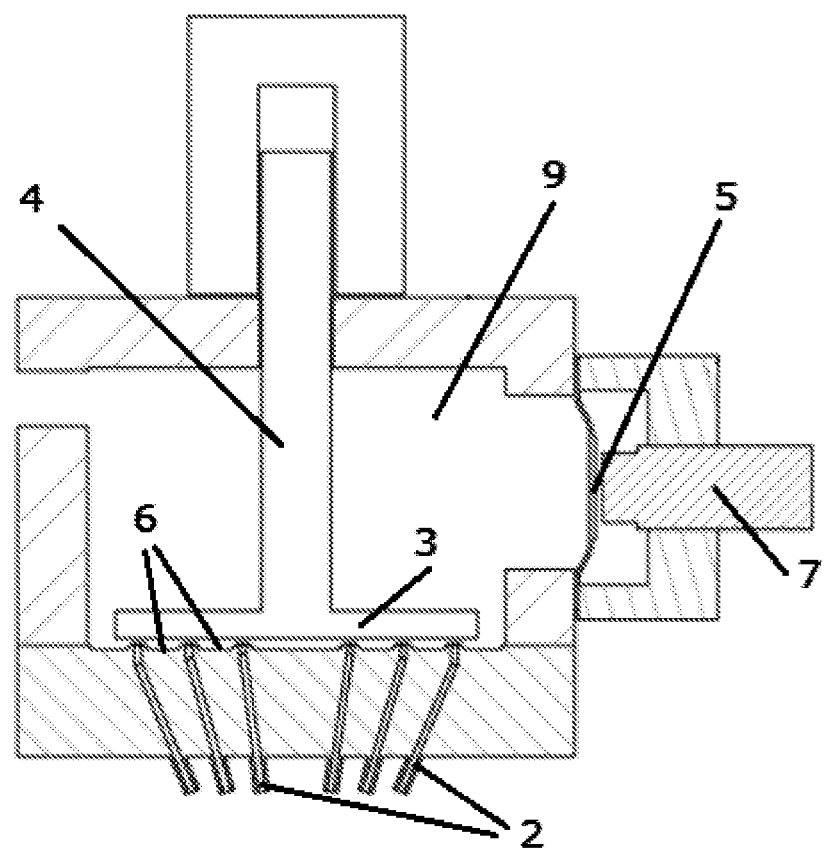
FIG. 4 shows a dosing chamber of a dosing device according to an embodiment of the invention, comprising a sensor for registering the displaced volume during a dosing.

FIG. 4 shows a dosing chamber (9) and nozzle assembly for a dosing device. The dosing chamber (9) comprises a deformable part (5) in a wall that can deform (typically bulge) by applying pressure/force. This is coupled to an actuator that can exert pressure/force on the deformable wall. Typically, this actuator is a tank filled with a gas whose pressure can be adjusted to act on and deform the deformable portion, thereby changing the internal volume of the dosing chamber. The applicant has provided one or more electrically conductive elements in the deformable part, and positioned an Eddy current sensor (7) (or several) in the dosing device to determine the distance to the one or more electrically conductive elements. On the basis of the distance between Eddy current sensor (7) and electrically conductive element in the deformable part (5), the difference in internal volume can therefore be easily calculated, and the effective dispensing volume thus easily determined.

Example 4

Figure 5A:
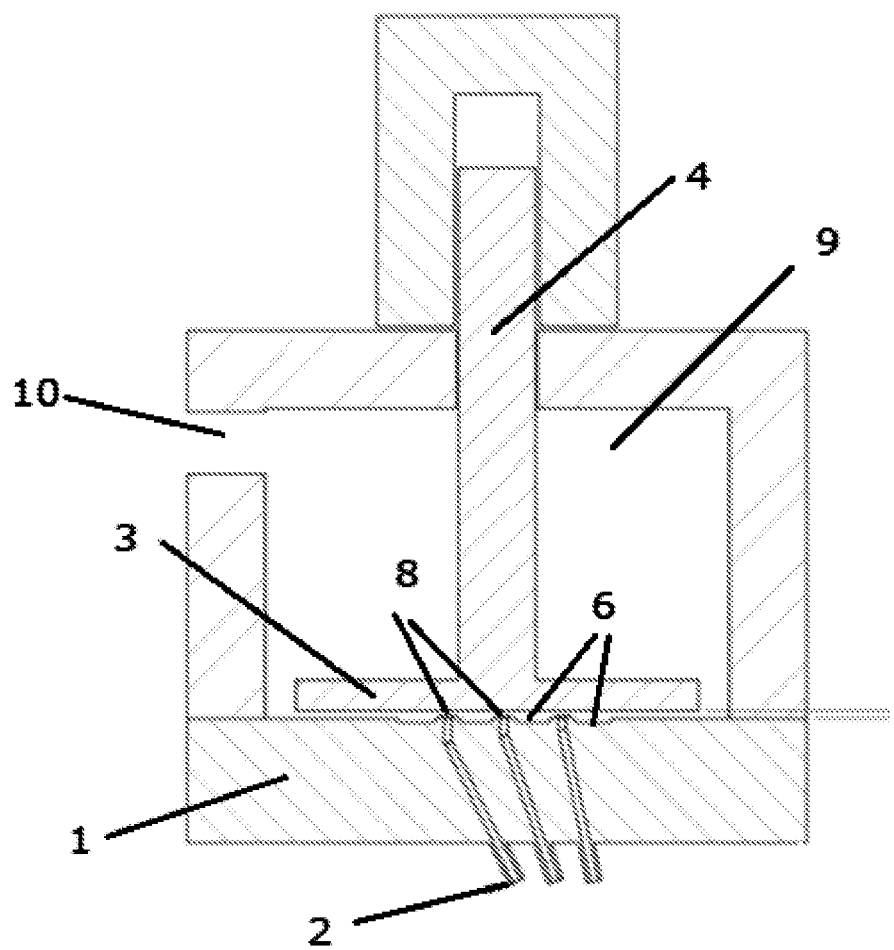
FIG. 5 A-B shows a perspective cross-sectional view of a dispensing device according to an embodiment of the invention, including a nozzle assembly with a multitude of dosing channels according to, respectively, FIGS. 1A-1B and FIGS. 2A-2B.
Figure 5B:
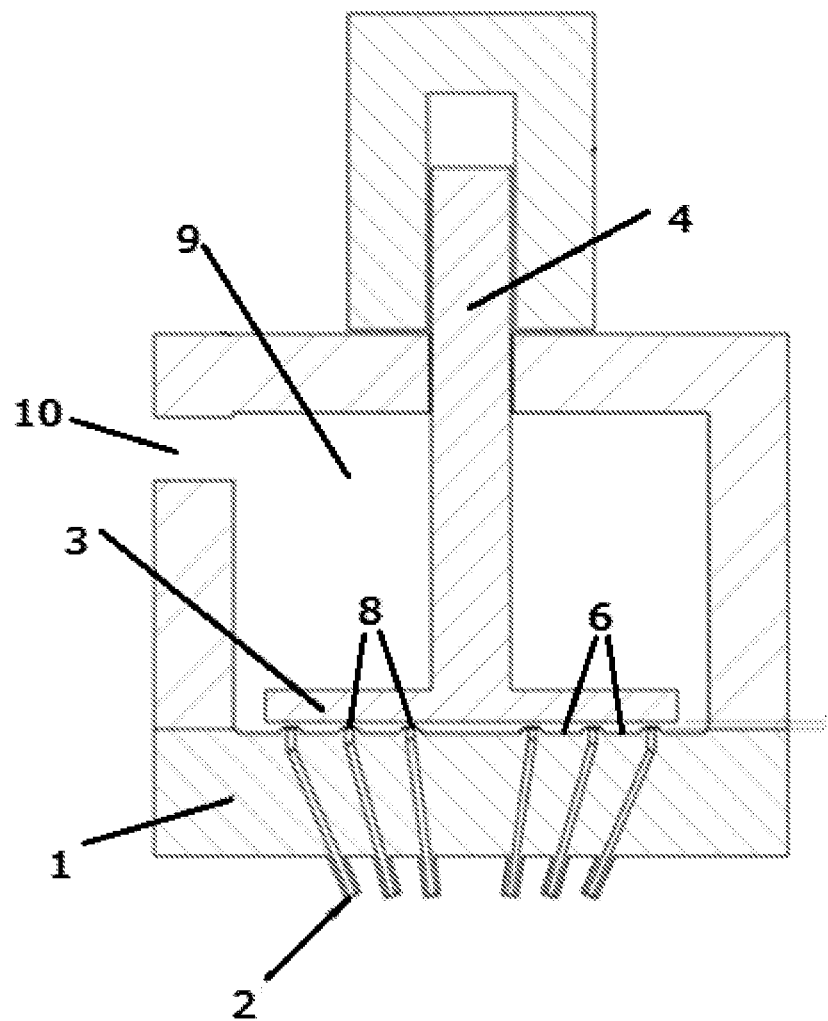

FIG. 5A-B shows a perspective cross-sectional view of a dosing device according to the invention, comprising a nozzle assembly whit a multitude of dosing channels (2), similar to that of FIGS. 1A-1B, and 2A-2B. The closure (3) can be moved up and down by means of an actuator or punch (4), to open or close the proximal openings (8) of the dosing channels (2) relative to the dosing fluid dispensing end of the dosing channels. In FIGS. 4, 5A and 5B, an inlet (10) is also visible to the dosing chamber (9), along which the dosing fluid is supplied, and is placed under adjustable pressure in the dosing chamber.

It is believed that the present invention is not limited to the embodiments described above and that some modifications or changes to the described examples can be added without revaluating the added claims. For example, the present invention has been described with reference to high frequency dosing of limited volumes, but it is to be understood that the invention can be applied to general dosages of low or medium volumes, whether or not at high speed/frequency.

Example 5

Figure 6:
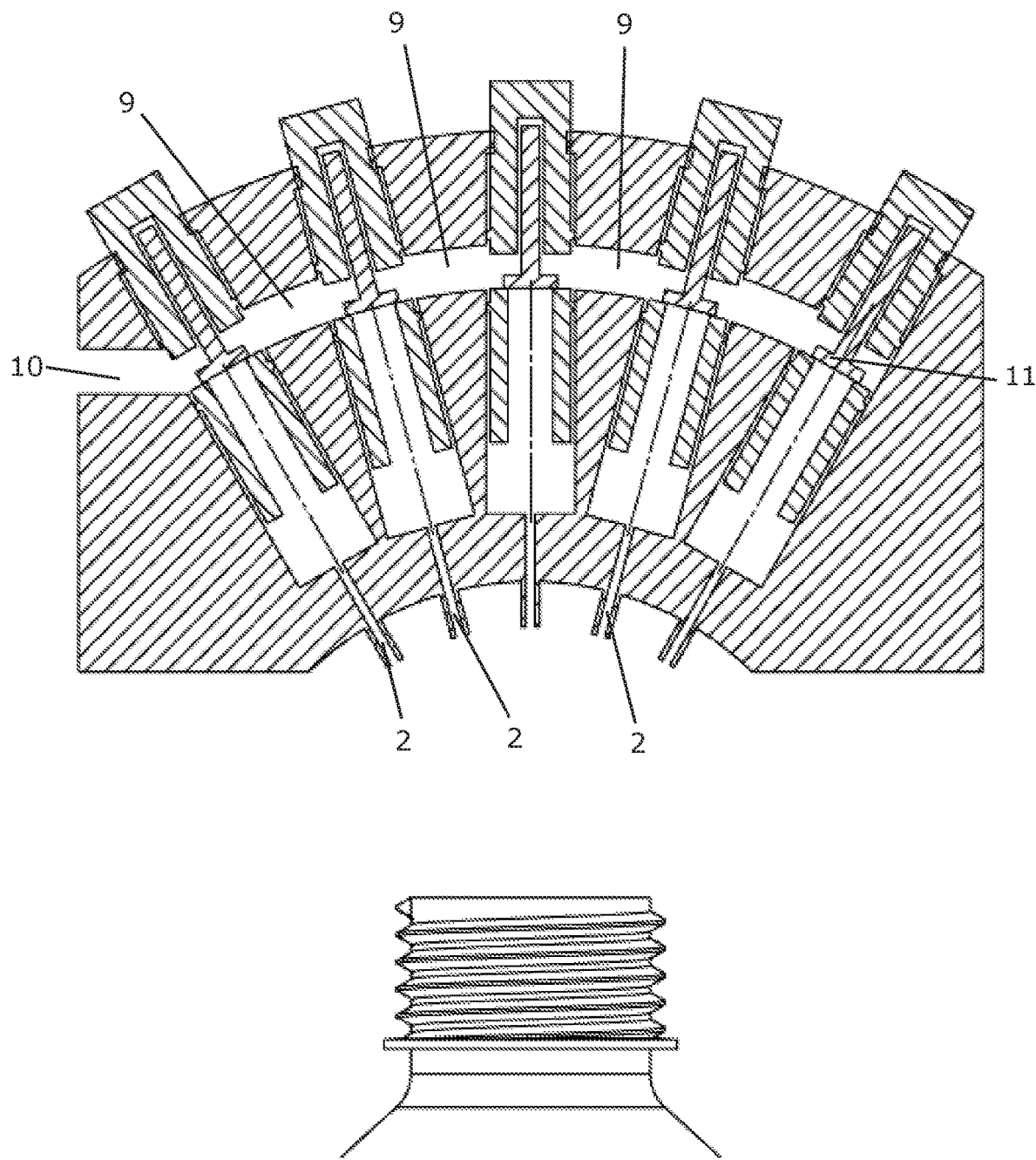
FIG. 6 shows a nozzle assembly comprising a divided dosing chamber.

FIG. 6 shows a nozzle assembly comprising a shared dosing chamber (9), to which dosage solution is supplied from an inlet (10). The assembly comprises 5 separate dosing channels (2) and the supply of the volume of dosing fluid is actuated by a valve (11) per dosing channel (2). The dosing channels (2) are oriented so that the jets of dosing fluid are directed to a central zone or point, substantially in or just above the neck of the container, in this case a bottle. Dimensions of FIG. 6 are non-limiting, and are discussed in the text above.

Figure 7:
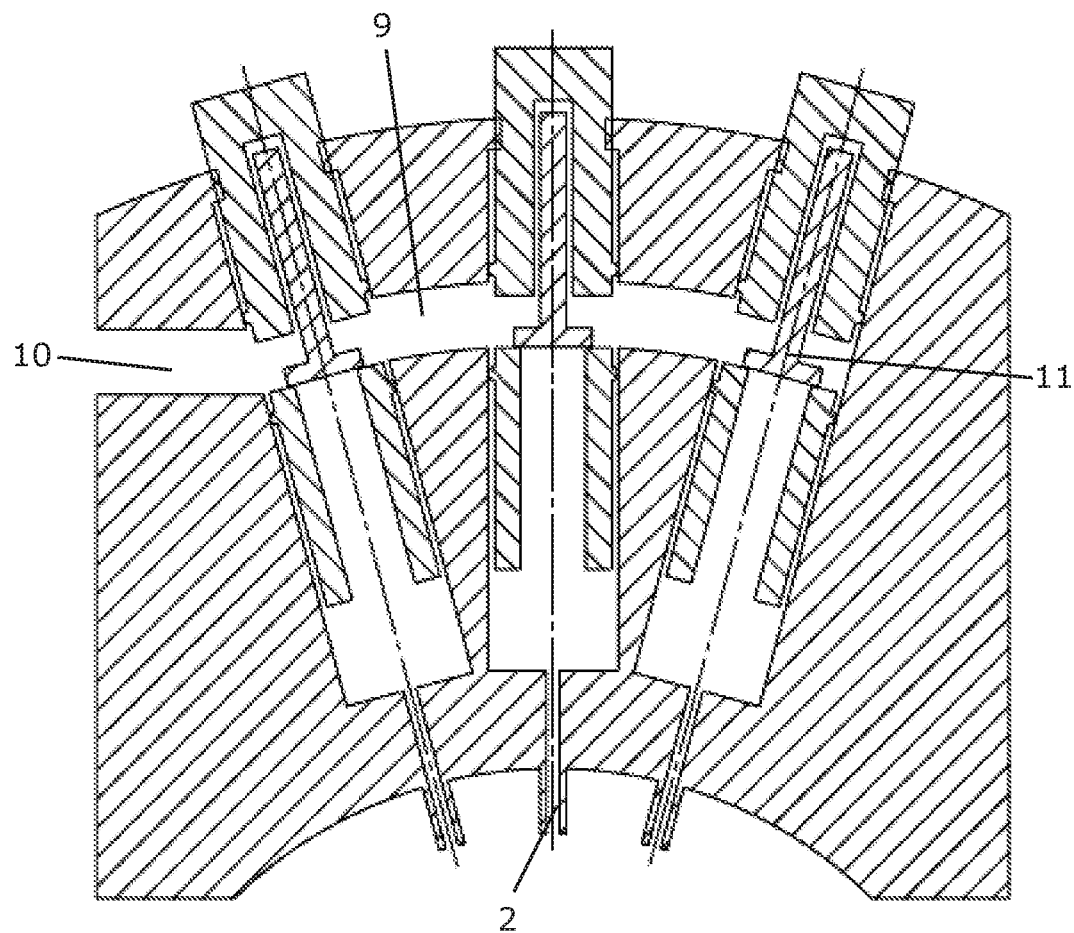
FIG. 7 shows a nozzle assembly according to FIG. 6 with 3 separate dosing channels.
Figure 7:
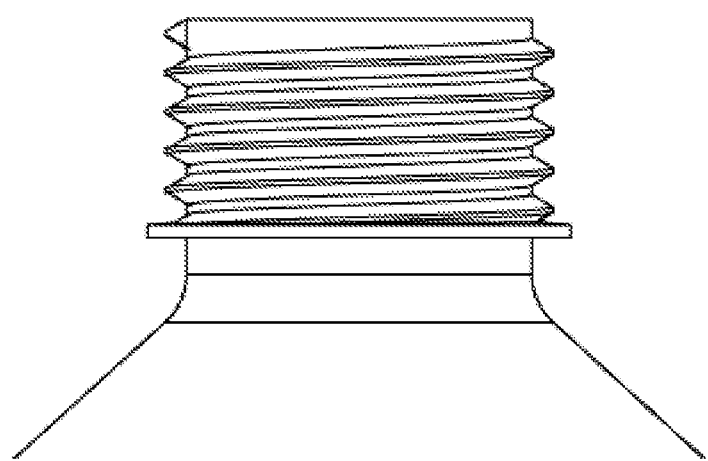

FIG. 7 shows a nozzle assembly according to FIG. 6 with 3 separate dosing channels (2) instead of 5.

Example 6

Figure 8:
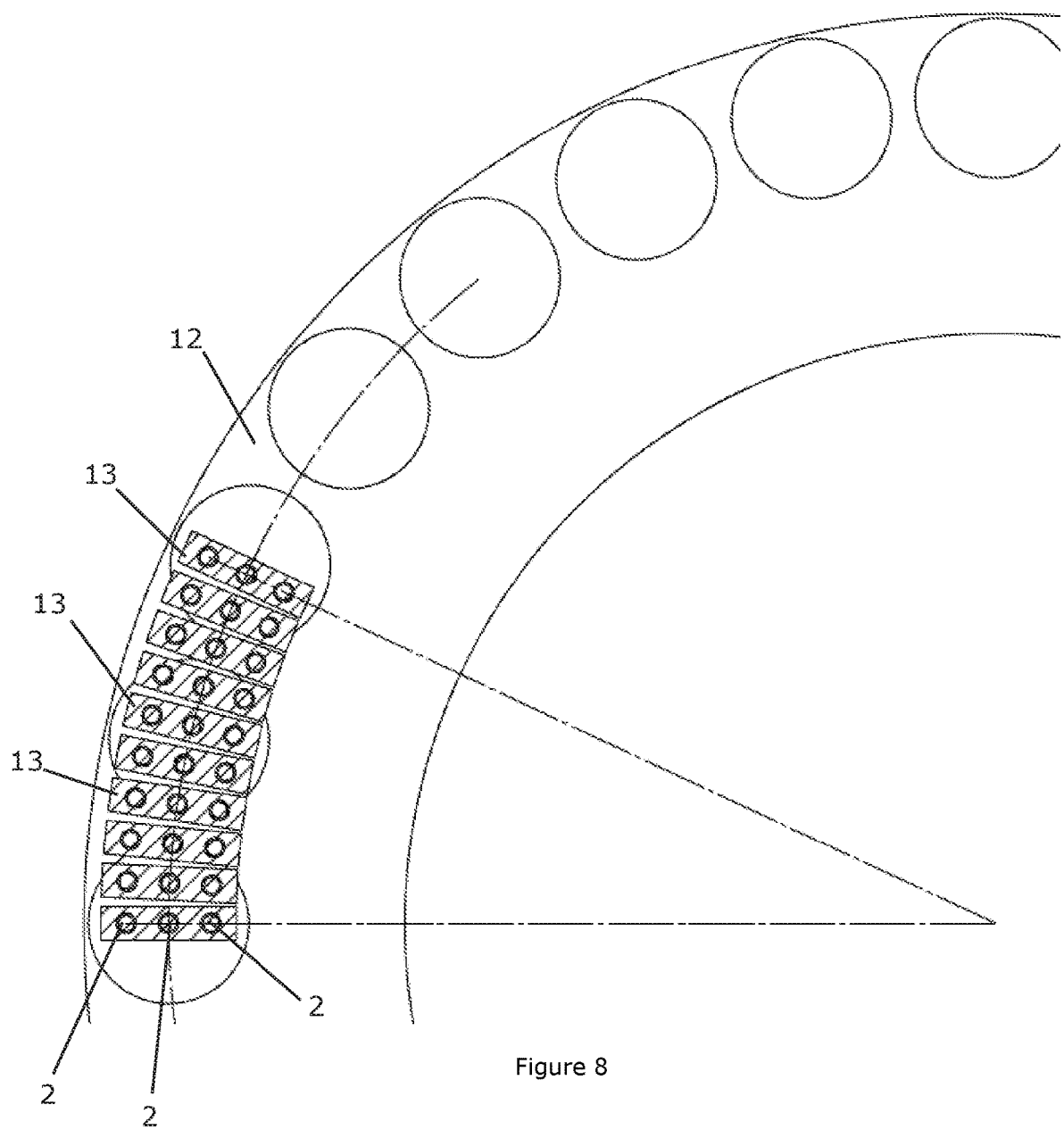
FIG. 8 shows a dosing line, where containers are transported via a transport device along nozzle assemblies according to the invention.

FIG. 8 shows a dosing line where containers are transported along a conveyor (12), and wherein a successive series of overhead nozzle assemblies (13) are provided above the conveyor (12). The overhead hanging nozzle assemblies are in this case nozzle assemblies according to FIG. 7 with three dosing channels (2), although deviation therefrom is possible according to another embodiment of the invention. By providing consecutive nozzle assemblies, dosing can be split across multiple stations, requiring a lower dosing per station, and not increasing the rate of dispensing liquid too quickly (to avoid splashing).

Example 7

Figure 9:
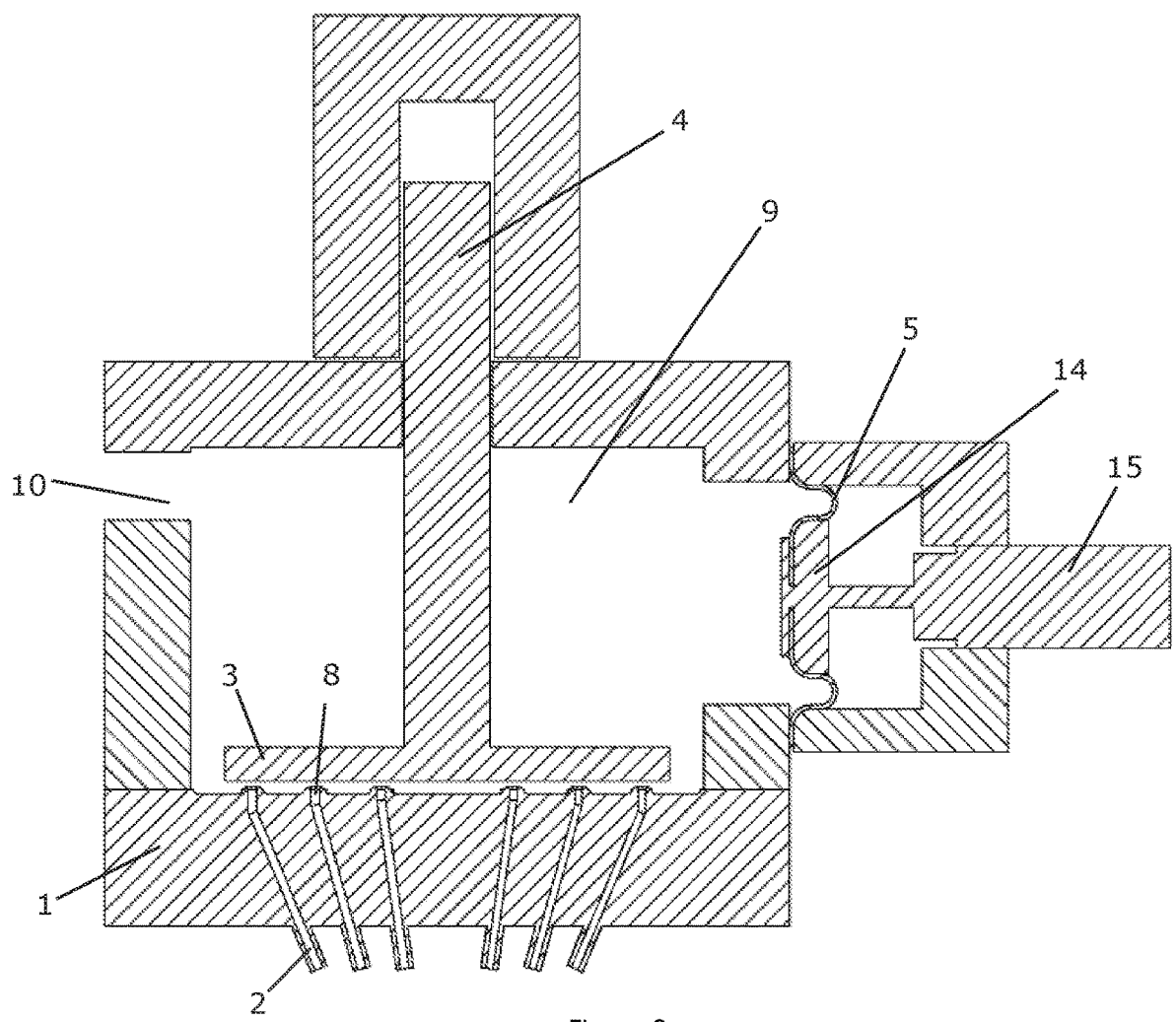
FIG. 9 shows a dosing chamber and nozzle assembly for a dosing device according to the invention.

FIG. 9 shows a dosing chamber (9) and nozzle assembly for a dosing device. The dosing chamber (9) comprises a deformable part or diaphragm (5), in this case a so-called rolling diaphragm, in a wall that can deform (typically bulge) by movement of a piston (14) driven by a servomotor (15). An actuator or tamper (4) closes and unlocks the dosing channels (2) for the dosing fluid in the dosing chamber (9). An additional advantage is that a servomotor allows to measure its stroke via an internal encoder, and can therefore perform an indirect volumetric measurement.

The invention claimed is:

1. A nozzle assembly for high-frequency supply of a predetermined volume of a dosing fluid, up to maximum volumes of the dosing fluid of 1.0 ml, in liquid containers, wherein the high-frequency supply is performed at a frequency of at least 5 dispensations of the predetermined volume of dosing fluid per second, wherein the nozzle assembly comprises a multiplicity of dosing channels extending in a same direction for the joint discharge of the predetermined volume of the dosing fluid, in which the dosing channels comprise a maximum internal diameter of 1.0 mm, and wherein the internal diameter of the dosing channels is constant along the dosing channels and is at least 0.7 mm, wherein at least some of the dosing channels extend at different angles with respect to each other, with at least a first group of said dosing channels oriented such that the extensions of said first group of said dosing channels converge in a convergence point on a distal side of the nozzle assembly, the nozzle assembly having at least 6 dosing channels, wherein the dosing channels extend independently of each other at distal ends thereof in separate hollow tubes over at least 4 mm, wherein the distal ends are open and are positioned at a minimal mutual distance of 0.8 mm from each other, wherein at least one of the dosing channels forms an angle of at least 5° with respect to a mean direction of all dosing channels, and wherein at least one of the dosing channels forms an angle of at least 10° with respect to the mean direction of all dosing channels.

2. The nozzle assembly according to claim 1, wherein a minimum value of said different angles is at least 2.5°.

3. The nozzle assembly according to claim 1, wherein at least half of the dosing channels form an angle of at least 5° with respect to the mean direction of all dosing channels, and wherein at least a quarter of the dosing channels form an angle of at least 10° with respect to the mean direction of all dosing channels.

4. The nozzle assembly according to claim 1, wherein the open distal ends of the dosing channels are positioned in several circular patterns with a common axis of rotation, and where the dosing channels of each circular pattern are oriented so that the extensions of the said dosing channels converge at a circular pattern convergence point.

5. The nozzle assembly according to claim 4, wherein the dosing channels of each circular pattern are all oriented with respect to a mean orientation of the dosing channels of the circular pattern at an angle of the same size.

6. The nozzle assembly according to claim 1, wherein the dosing channels are positioned into one or more rows, wherein the dosing channels of each of the rows are oriented so that the extensions of the dosing channels of each of the rows converge in a row convergence point.

7. The nozzle assembly according to claim 1, wherein each dosing channel is provided with a separate valve for controlling the dosing channel.

8. The nozzle assembly according to claim 1, wherein the nozzle assembly comprises two or more separate nozzles, each comprising one or more of the dosing channels.

9. The nozzle assembly according to claim 1, wherein the dosing channels have a length between 5 mm and 30 mm.

10. The nozzle assembly according to claim 1, wherein the open distal ends of the dosing channels are positioned relative to each other at a minimum spacing of 1.2 mm.

11. The nozzle assembly according to claim 1, wherein the dosing channels are straight and are all oriented to a common point.

12. The nozzle assembly according to claim 11, wherein the dosing channels make an angle of 50° relative to the mean direction of the dosing channels.

13. The nozzle assembly according to claim 1, wherein the dosing channels are positioned in a rectangular pattern in rows and columns.

14. A dosing device for high frequency supply of a predetermined volume of a dosing fluid, up to 1.0 ml, in pre-filled or unfilled liquid containers through an opening of the liquid containers, the liquid containers being provided at a constant speed along the dosing device, wherein the high-frequency supply is performed at a frequency of at least 5 dispensations of the predetermined volume of the dosing fluid per second, the dosing device comprising at least:
   a. a nozzle assembly comprising a plurality of dosing channels for jointly discharging the dosing fluid in the predetermined volume, the nozzle assembly according to claim 1;
   b. a dosing chamber for supplying the dosing fluid to the nozzle assembly under a predetermined or non-constant pressure.

15. The dosing device according to claim 14, further comprising a pneumatic actuator for deforming a deformable part.

16. The dosing device according to claim 14, wherein the dosing device includes a movable closing device for sealing or establishing a fluid connection between the dosing chamber and the nozzle assembly.

17. The dosing device according to claim 16, wherein the movable closing device is provided with an elastomer coating on a side of the nozzle assembly, for liquid-tight sealing of the nozzle assembly with respect to the dosing chamber.

18. The dosing device according to claim 17, wherein the elastomer coating comprises fluorinated propylene monomer (FPM) or fluorine rubber (FKM).

19. The dosing device according to claim 14, wherein the movable closing device is provided with a plurality of openings through the movable closing device and wherein the movable closing device is positioned in the dosing device such that the openings in the movable closing device do not allow a liquid connection between the dosing chamber and the nozzle assembly when the movable closing device closes an initial liquid connection between the dosing chamber and the nozzle assembly.

20. The dosing device according to claim 14, further comprising a servomotor, a piston, and a deformable part or diaphragm in a wall of the chamber, wherein the deformable part or diaphragm is deformable by movement of a piston-controlled by the servomotor.

* * * * *